United States Patent
Nett et al.

(10) Patent No.: US 9,710,918 B2
(45) Date of Patent: Jul. 18, 2017

(54) SYSTEM AND METHOD FOR IMAGE RECONSTRUCTION USER INTERFACE

(71) Applicant: General Electric Company, Schenectady, NY (US)

(72) Inventors: Elizabeth Nett, Waukesha, WI (US); John Londt, Oconomowoc, WI (US); Scott Slavic, Sussex, WI (US); Bradley Gabrielse, Brookfield, WI (US); John Jackson, Waukesha, WI (US); Mark Profio, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 14/824,153

(22) Filed: Aug. 12, 2015

(65) Prior Publication Data
US 2017/0046850 A1 Feb. 16, 2017

(51) Int. Cl.
*G06T 7/20* (2017.01)
*G06T 7/00* (2017.01)
*G06T 11/60* (2006.01)

(52) U.S. Cl.
CPC .............. *G06T 7/20* (2013.01); *G06T 7/0012* (2013.01); *G06T 11/60* (2013.01); *G06T 2207/10116* (2013.01)

(58) Field of Classification Search
CPC ....... G06T 7/0012; G06T 7/20; G06T 7/2006; G06T 11/003; G06T 11/005; G06T 2207/10081; G06T 2207/20092; G06T 2211/40; G06T 7/215; A61B 6/461; A61B 6/465; A61B 6/467; A61B 6/486; A61B 6/5264
See application file for complete search history.

(56) References Cited

U.S. PATENT DOCUMENTS

| | | | | |
|---|---|---|---|---|
| 6,438,196 | B1 | 8/2002 | Cesmeli | 378/8 |
| 6,628,743 | B1 | 9/2003 | Drummond et al. | 378/8 |
| 2006/0133564 | A1* | 6/2006 | Langan et al. | 378/8 |
| 2007/0053482 | A1* | 3/2007 | Kohler et al. | 378/8 |
| 2014/0098932 | A1 | 4/2014 | Profio et al. | 378/19 |
| 2014/0301622 | A1* | 10/2014 | Forman | G06T 11/005 382/131 |

OTHER PUBLICATIONS

Sennst, Dirk-Alexander et al. "An Extensible Software-Based Platform for Reconstruction and Evaluation of CT Images", RadioGraphics; Mar.-Apr. 2004, vol. 24, No. 2; pp. 601-613.

* cited by examiner

*Primary Examiner* — Andrew W Johns
(74) *Attorney, Agent, or Firm* — McCoy Russell LLP (57) ABSTRACT

A system and method for an image reconstruction user interface is provided. An imaging system may be used to scan a subject and provide reconstructed images of the subject. Reconstructed images may be output to a display, printer, network, and/or memory storage device. To view information and select options for image reconstruction, a visualization system and method is utilized.

19 Claims, 4 Drawing Sheets

SYSTEM AND METHOD FOR IMAGE RECONSTRUCTION USER INTERFACE

BACKGROUND

The subject matter disclosed herein relates generally to imaging systems and methods and, more particularly, image reconstruction and related user interfaces.

A medical imaging system can include a gantry comprising a stationary frame supporting a rotary member about a scanning axis of a scanner. The rotary member includes a central opening large enough to receive a patient extending along the scanning axis. The rotary member is rotated about a patient during a scanning or imaging procedure. An x-ray tube can be positioned on the rotary member diametrically across the central opening from an array of x-ray detectors. As the rotary member rotates, the x-ray tube projects a beam of energy, or x-rays, along a scan plane, through a patient, and to the detector array. By rotating the x-ray source about the scanning axis and relative to the patient, x-rays are projected through a patient from many different directions. An image of the scanned portion of a patient can be reconstructed from data provided by the detector array using a computer.

Various aspects of the imaging process may negatively affect the quality of the output image. Patient motion is one such aspect. Patient motion may be caused by a moving organ, such as a heart or lung, or by gross patient motion within the central opening of the stationary frame. Acquisition intervals which do not align with regular periodic motion of a patient result in challenges in reconstructing clinically useful images. The reconstruction challenge increases when the organ movement rate changes erratically or unexpectedly. Improving the experiences of the patient and operator, as well as improving image quality of the output image, can be accomplished through improved image reconstruction and related user interfaces.

An operator console may be provided in such medical imaging systems. The operator console can provide input to and output from components in the medical imaging system. For example, the operator console can include a display device for displaying the output image. It is important that an operator console user interface for such an imaging system provide improved options and control to the operator of an imaging exam. It is important that the user interface be useful and helpful, especially in an area such as image reconstruction.

BRIEF DESCRIPTION

In accordance with an embodiment, an image reconstruction system and imaging methods are provided, including a gantry comprising a rotor, an x-ray tube, and image detector, wherein the rotor is movably attached to the gantry, and the x-ray tube and image detector are attached to the rotor; an image reconstructor for receiving scan data of a subject from the image detector and reconstructing the scan data into output images; an operator console comprising an input device and an output device; a processor in communication with the gantry, image reconstructor, and operator console; and wherein the system performs the steps of (a) acquiring scan data over a plurality of motion cycles of the subject; (b) generating representative motion data from the scan data over the plurality of motion cycles; (c) outputting a visualization to the output device of the representative motion data; (d) outputting image reconstruction recommendations to the output device based on the scan data. The outputted image reconstruction recommendations may be visually overlaid on top of the visualization. The output device is one of a display, a printer, a network, or a storage memory. The motion cycles may be one of cardiac motion cycles, respiratory motion cycles, or gross patient motion cycles.

The system and method may further perform the steps of (e) receiving an input selection from the input device, the input selection corresponding to an image reconstruction selection; (f) reconstructing the scan data into an output image based on the input selection; and (g) outputting the output image to the output device. The system and method may further perform the steps of (e) receiving input indicating the request for an expanded view; (f) outputting an expanded view section of the visualization, such that one or more single motion cycles of scan data are shown; and (g) overlaying a success metric on each single cycle of scan data shown in the expanded view.

Further, acquiring scan data may be performed with reference to scan instructions; and outputted image reconstruction options may be generated with reference to scan instructions. The representative motion data may be shown as a single motion cycle in the output visualization. The generated representative motion data may be a mean or median of the motion data from the plurality of motion cycles in the scan data. And the image reconstruction recommendations may include a slider overlaid upon the visualized representative motion data to select a location within the motion cycle to perform image reconstruction.

DETAILED DESCRIPTION

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
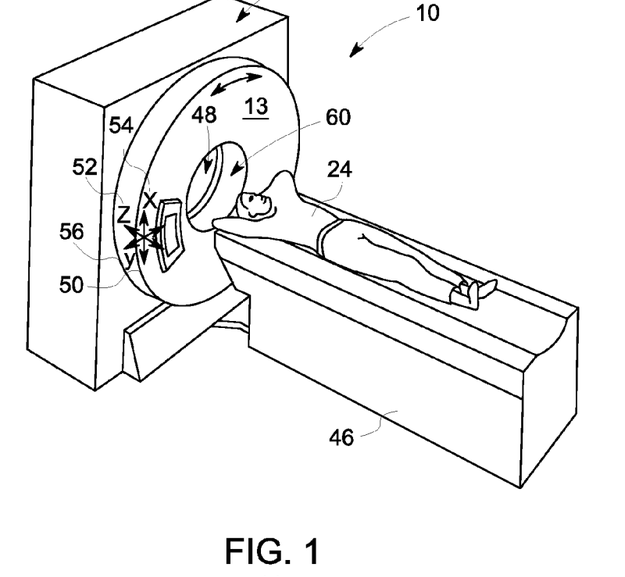
FIG. 1 shows a perspective view of a medical imaging system with a gantry, in accordance with an embodiment.
Figure 2:
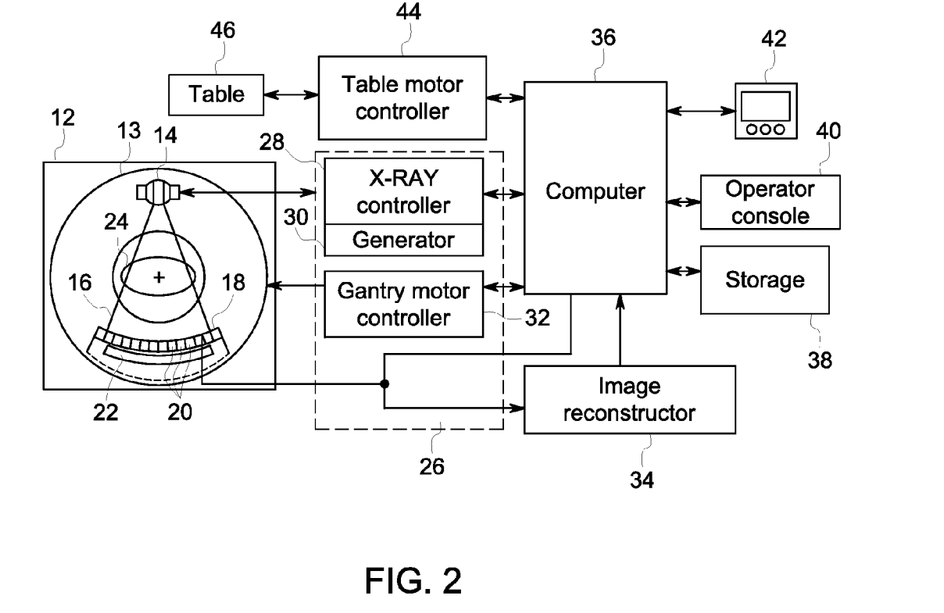
FIG. 2 shows a block schematic diagram of a medical imaging system, in accordance with an embodiment.

FIGS. 1 and 2 show a computed tomography (CT) imaging system 10 including a gantry 12. Gantry 12 has a rotary member 13 with an x-ray source 14 that projects a beam of x-rays 16 toward a detector assembly 18 on the opposite side of the rotary member 13. Rotary member 13 may also be called a rotor. A main bearing may be utilized to attach the rotary member 13 to the stationary structure of the gantry 12. X-ray source 14 includes either a stationary target or a rotating target. Detector assembly 18 is formed by a plurality of detectors 20 and data acquisition systems (DAS) 22. A collimator can be included at the detector end and/or at the x-ray emission end depending on the particular embodiment configuration. The plurality of detectors 20 sense the projected x-rays that pass through a subject 24, and DAS 22 converts the data to digital signals for subsequent processing. Each detector 20 produces an analog or digital electrical signal that represents the intensity of an impinging x-ray beam and hence the attenuated beam as it passes through subject 24. During a scan to acquire x-ray projection data, rotary member 13 and the components mounted thereon can rotate about a center of rotation.

Rotation of rotary member 13 and the operation of x-ray source 14 are governed by a control mechanism 26 of CT system 10. Control mechanism 26 can include an x-ray controller 28 and generator 30 that provides power and timing signals to x-ray source 14 and a gantry motor controller 32 that controls the rotational speed and position of rotary member 13. An image reconstructor 34 receives sampled and digitized x-ray data from DAS 22 and performs high speed image reconstruction. The reconstructed image is output to a computer 36 which stores the image in a computer storage device 38.

Computer 36 also receives commands and scanning parameters from an operator via operator console 40 that has some form of operator interface, such as a keyboard, mouse, touch sensitive controller, voice activated controller, or any other suitable input apparatus. Display 42 allows the operator to observe the reconstructed image and other data from computer 36. The operator supplied commands and parameters are used by computer 36 to provide control signals and information to DAS 22, x-ray controller 28, and gantry motor controller 32. In addition, computer 36 operates a table motor controller 44 which controls a motorized table 46 to position subject 24 and gantry 12. Particularly, table 46 moves a subject 24 through a gantry bore 48, or opening, in whole or in part. A coordinate system 50 defines a patient or Z-axis 52 along which subject 24 is moved in and out of opening 48, a gantry circumferential or X-axis 54 along which detector assembly 18 passes, and a Y-axis 56 that passes along a direction from a focal spot of x-ray tube 14 to detector assembly 18.

While some embodiments may include a CT system for handling the imagine acquisition, image processing, image output, and user interface, other systems may be used, such as a PET, SPECT, or MR system.

Figure 3:
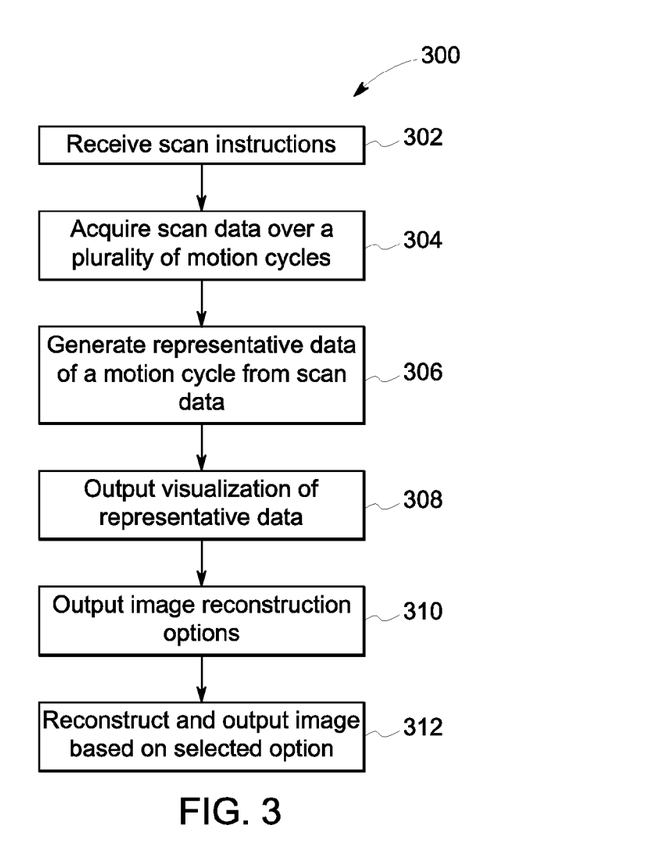
FIG. 3 shows a system operation flowchart, in accordance with an embodiment.

FIG. 3 shows a system operation flowchart, in accordance with an embodiment. The system can perform the steps in process 300 to provide a useful image scan of a subject as well as user interface information and selection options to provide high quality image reconstruction.

In step 302, the imaging system receives scan instructions. The scan instructions may be generated based on manual inputs and automatic processing. These scan instructions may be generated locally, through the local operator console 40, or may be generated remotely and transmitted over through a wired or wireless network to the imaging system for scan execution.

An operator using the operator console can input scan instructions such as imaging protocol option values, clinical identifiers that describe clinical intent, patient history information, a reconstruction setting, and more. The reconstruction setting can be independent of measurements of the patient's movement rhythm, other scan parameters, and of the prescribed times or phases that will be targeted for acquisition based on the patient's movement rhythm. The user or system can set a prescribed reconstruction phase of a motion cycle, further discussed throughout, including with reference to reconstruction prescription 728 shown in FIG. 7.

The system may also include in the scan instructions automatically supplied information based on the clinical scan identifier and patient selected. The user's intention, as indicated by a setting such as a clinical scan identifier, or preset for the exam can assist in choosing the data for image reconstruction. Scans with different clinical scan identifiers set in scan instructions may be handled differently by the imaging system. Patient information may include heart rate, heart rate variation, irregular heartbeats, age, medical history, and other data pulled from their electronic medical records. These may be provided locally or from remote data storage. Patient information may be used to generate the scan instructions of step 302.

In step 304, the imaging system acquires scan data over a plurality of time intervals or motion cycles. This can be called a multi-slab, multi-exposure scan or one continuous exposure over multiple physiological motion cycles. The scan can be at a single or multiple table positions in the z-direction. The system acquires the scan data by performing a CT imaging operation, such as described with reference to FIG. 1 and FIG. 2. The scan data can include physiologic and other data picked up by the system that may be acquired at the same time as the x-ray or MRI or SPECT signals, including the time within a few seconds before and after.

The data acquisition intervals can be in multiple motion cycles, such as cardiac cycles, respiratory cycles, gross patient motion cycles or other motion cycles. In much of the specific examples discussed herein, cardiac motion will be referred to for ease of explaining various embodiments. These data acquisition intervals may be physiologically-triggered or gated relative to the motion cycles.

In step 306, the system generates representative data of a motion cycle from motion-related data acquired as part of the scan data. The scan data includes data over multiple motion cycles. The system can take the scan data and generate representative data by taking the median, mean, time scaling, or other methods of condensing multiple motion cycles into a single representative cycle. Note, that when motion data is discussed, it may be direct measurement of motion or data related to, or correlated with, a motion cycle. For example, an ECG signal is an electrical signal related to a heart. As such, it is data related to the motion of the heart, but not motion data by itself. Thus, for clarity of understanding, motion data herein refers to motion data and data related to motion.

In step 308, the system outputs a visualization of the representative data. This can be seen in FIG. 5, FIG. 6, and FIG. 7, for example. The system displays a graphical summary of the time image data was acquired and the motion, e.g. ECG, waveform condensed into a single, representative motion cycle. The output can also be done to a remote device over a network, to a memory storage, or to a physical output device such as a printer.

The system also outputs supplemental information related to the representative data as well. For example, the time and phase information, exam success metrics, and R-to-R interval values. The supplemental information may be overlaid or placed alongside the visualization of the representative data.

In step 310, the system outputs image reconstruction options. These options may be overlaid, alongside, in a separate window, or on a separate screen to the visualization of the representative data. These image reconstruction options are shown more fully in relation to FIG. 5, FIG. 6, and FIG. 7, as examples. Such options can be interactive to allow a user to select, adjust, and choose different image reconstruction options which may be well suited for the particular image data and patient. Chosen phases for reconstruction, specific reconstruction recommendations, and initial reconstruction prescription information can be included in image reconstruction options. The system can generate these recommendations for reconstruction phases based on logged information during the scan, exam information, selected clinical scan identifier, patient profile, protocol selections, and/or patient history information. For example, based on the user's intent for a cardiac exam and the patient's heart rate statistics, the system could choose reconstruction phases or times based on a user defined rule set.

In step 312, the system reconstructs and outputs a final image based on the selected reconstruction option. This may be performed by image reconstructor 34 in an embodiment.

Figure 4:
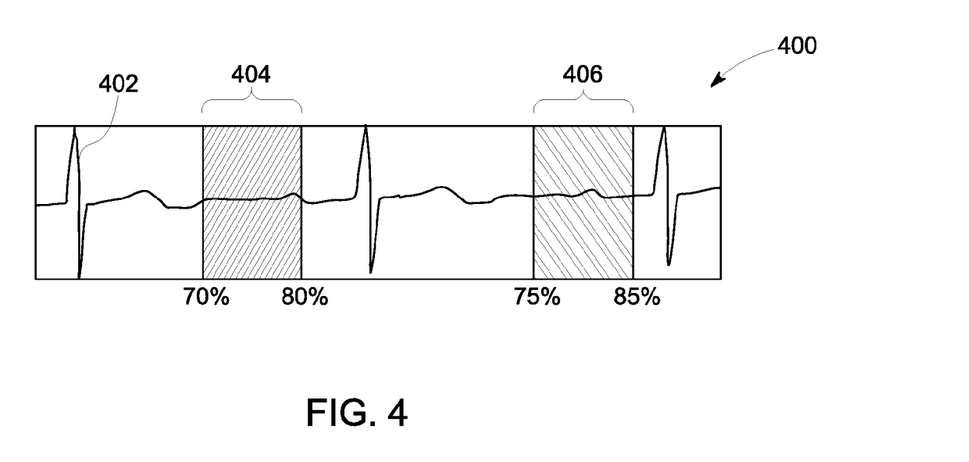
FIG. 4 shows an exemplary user interface window with multiple motion cycles, in accordance with an embodiment.

FIG. 4 shows an exemplary user interface window with multiple motion cycles, in accordance with an embodiment. FIG. 4 shows a visualization 400 of motion information data, specifically cardiac motion information in this example. Multiple electrocardiogram (ECG) R-to-R intervals are shown, along with ECG signal 402, first reconstruction phase 404, and second reconstruction phase 406. A reconstruction phase includes particular times in the heart cycle where reconstruction is recommended. The cardiac phase information is obtained by dividing each cardiac cycle of the ECG signal into sections that represent the different cardiac phases. One cardiac cycle within an ECG signal is understood to be represented by the part of the signal plotted from one R peak to the next R peak, the RR interval.

Figure 5:
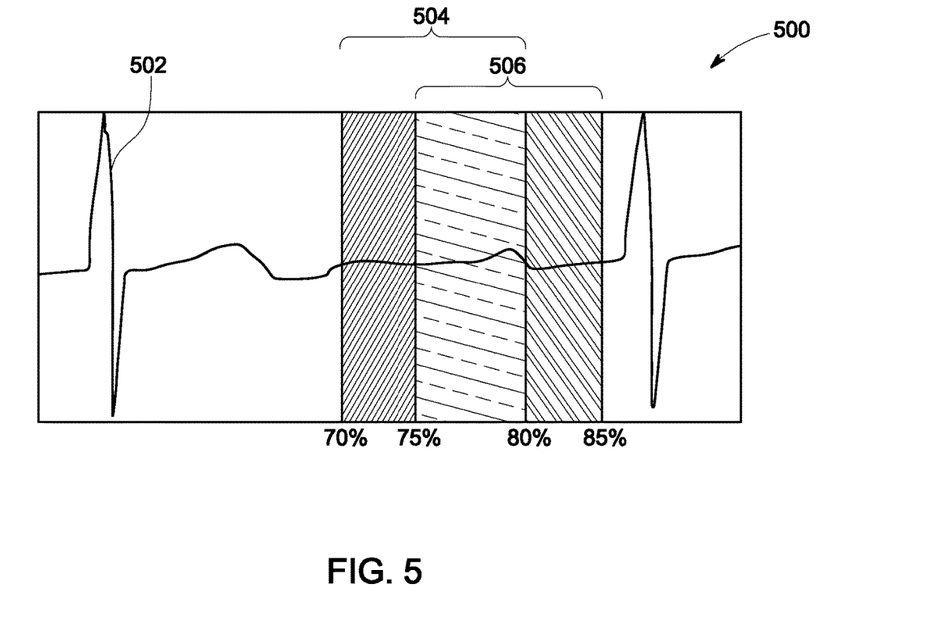
FIG. 5 shows an exemplary user interface window with an overlapped view, in accordance with an embodiment.

FIG. 5 shows an exemplary user interface window with an overlapped view, in accordance with an embodiment. The overlapped view may also be referred to as an intersection view. A user of the user interface, such as a medical clinician, can interact with the visualization to select the cardiac reconstruction phase with a mouse or other input mechanisms.

Overlapped visualization 500 includes representative motion signal 502, e.g. ECG cardiac signal, first reconstruction phase 504, and second reconstruction phase 506. The system outputs a representative motion signal 502, as generated by step 306, in overlapped visualization 500. Overlapped visualization 500 also includes percentages of the R-to-R internal for the ends of each reconstruction phase range. As an alternative or combination, overlapped visualization 500 may include time designations for phase boundaries, such as in milliseconds.

First reconstruction phase 504 indicates that from 70% to 80% of the R-to-R interval, the system allows for selecting the image reconstruction location. Second reconstruction phase 506 indicates that from 75% to 85% of the R-to-R interval, the system allows for selecting the image reconstruction location. Intersection region, shown as between 75% and 80%, visualizes where the image reconstruction phase regions overlap. Reconstruction phases 504 and 506 can also be referred to as available reconstruction data in time.

The visualization of FIG. 5, as well as other figures and description throughout, helps to improve the workflow for image reconstruction, including cardiac reconstruction and respiratory reconstruction. Improved output images, in step 312, are achieved by selecting the best image reconstruction phase and other reconstruction options from the information in the visualizations discussed herein.

Figure 6:
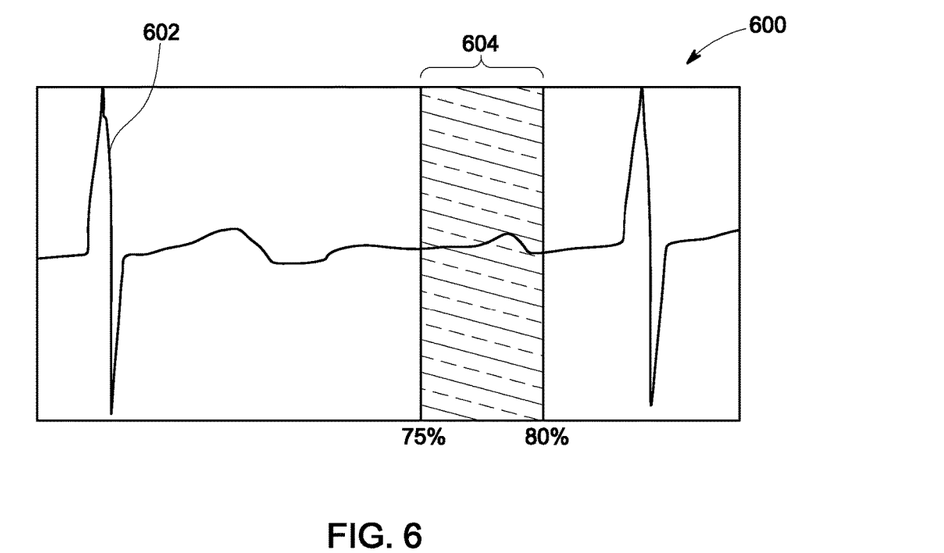
FIG. 6 shows an exemplary user interface window with a union view, in accordance with an embodiment.

FIG. 6 shows an exemplary user interface window with a union view, in accordance with an embodiment. Union visualization 600 includes a representative motion cycle 602 and a union reconstruction phase 604. Union reconstruction phase 604 shows the common phases between all usable motion cycles. All usable motion cycles can be all motion cycles, or a subset. For example, if a motion cycle is an irregular motion or completely out of range for some unexpected reason, the system can choose to ignore it as it would negatively impact the generation and usefulness of the union reconstruction phase 604.

The user interface and interactive visualizations contemplated herein can be switched between in the overall UI of the operator console. Through an input from the user, the system can easily switch between different views, such as the views of FIG. 5, FIG. 6, and FIG. 7.

Figure 7:
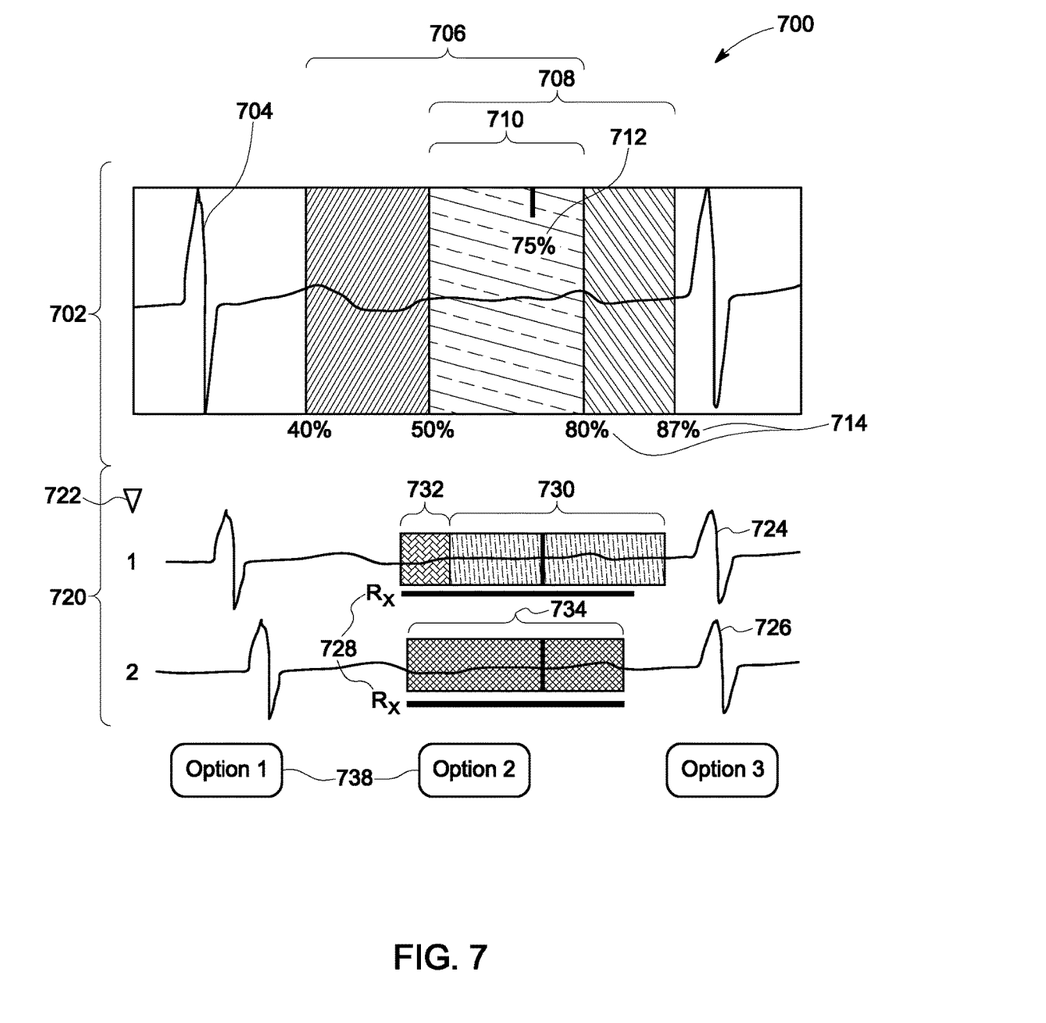
FIG. 7 shows an exemplary user interface window with an expanded view, in accordance with an embodiment.

FIG. 7 shows an exemplary user interface window with an expanded view, in accordance with an embodiment. Expanded visualization 700 includes initial view 702, representative motion signal 704, first reconstruction phases 706, second reconstruction phases 708, union reconstruction phase 710, reconstruction location indicator 712, peak to peak references 714, expanded view 720, expansion icon 722, first motion cycle 724, second motion cycle 726, reconstruction prescription 728, successful data metric 734, intermediate data metric 730, unsuccessful data metric 732, and reconstruction options 738.

Initial view 702 is shown as similar in some respects to the overlapped view of FIG. 5. In this instance, more than two cycles are summarized in the initial view 702. First reconstruction phases 706 and second reconstruction phases 708 show how far throughout the motion cycle reconstruction could reasonably be performed based on the acquired scan data. Union reconstruction phase 710 indicates, for example, a union area that at least 80% of the motion cycles have in common. The 80% value is an example threshold value; other values can be set or determined in the system. The system may also include an exclude icon at the individual motion cycle display sections, allowing users to exclude or re-include certain motion cycles from the overall analysis and recommendations. Peak to peak references 714 indicate the locations within initial view 702 where the reconstruction phases 706, 708, and 710 indicated start and end.

Reconstruction location indicator 712 is a visual indicator of the recommended reconstruction location in the cardiac cycle. This may be shown as a percentage as shown in FIG. 7, or can be a time value, such as in milliseconds from the last peak (R-peak). The system displays an initial value in the visualization, which can be adjustable through the interface by a touch or mouse interaction. The interaction may slide or move reconstruction location indicator to the left or right, for example. Thus, the indicator could be called a slider in some embodiments. The interaction may move the vertical line in initial view 702 and the vertical lines in the individual cycles shown in expanded view 720. This would be an indication to the system that the image reconstruction should occur at the newly selected percentage value within the motion cycle. The starting position, the initial reconstruction phase value, of reconstruction location indicator 712 can be set in the protocol by the user or automatically by the system based on criteria.

Expanded view 720 shows individual motion cycles from the acquired scan data. Expanded view 720 may include all the motion cycles or only motion cycles that fit with a criteria. For example, if a heartbeat is irregular, it could be excluded from consideration. Expanded view 720 allows a user of the system to investigate in more detail the underlying data and information related to image reconstruction options and recommendations.

Expansion icon 722 is an interactive visual icon that hides and shows expanded view 720 based on user input. Expansion icon 722 is shown as a triangle pointing down in FIG. 7. Expansion icon 722 can also be referred to as a view selection icon. In a view that only includes initial view 702 and expansion icon 722, the triangle may point to the right. Other configurations and icons with similar meaning can be used for such a feature. Expansion icon 722 allows the user to see the level of detail they would like to see between the initial view 702 and expanded view 720.

First motion cycle 724 includes an ECG trace, or waveform, indicating cardiac motion over one heartbeat cycle. Second motion cycle 726 includes an ECG trace, or waveform, indicating cardiac motion over a different heartbeat cycle from that of first motion cycle 724. This view can help the user of the user interface understand the detailed scan data underlying the summary in initial view 702.

Optionally, each motion cycle shown in expanded view 720 can also include a reconstruction prescription 728. This is a predicted or selected value from the scan parameters that is the initial target for the image reconstruction. The initial reconstruction location is shown as a vertical line according to one embodiment. This vertical line can move based on the user input and selection of a final image reconstruction location.

First motion cycle 724 includes intermediate success metric 730. This could be shaded yellow in some embodiments. This is a shaded window showing where the image reconstruction would be recommended based on the actual scanned data. Since this recommendation does not line up with reconstruction prescription 728, but overlaps partially, the success metric is intermediate. Unsuccessful metric 732 shows the area where reconstruction prescription 728 was expected, but the recommended image reconstruction window does not overlap. Unsuccessful metric 732 can be a shading window of the color red, for example. Other user interface icons for indicating success, intermediate, and failure may also be used.

Second motion cycle 726 includes successful metric 734. This is a shaded window showing where the image reconstruction would be recommended based on the actual scanned data. Since the recommendation lines up with reconstruction prescription 728, the success metric is successful. Successful metric 734 could be shaded green in some embodiments. Other user interface icons for indicating success, intermediate, and failure may also be used. Information related to the success metrics 730, 732, and 734 can be fed back into the system to be used information in generating future scan parameters for the current patient and other patients.

The system can customize and dynamically update the visualizations herein. For example, if motion is irregular, the motion line can be purple or other color indicating a variation from the norm. In addition, if an operator manually edits the motion profile (e.g. removes or alters an R-peak location in time) the visualization of success can change, in an embodiment.

Reconstruction options 738 may be displayed in an embodiment. The visualization may include interactivity allowing for direct selection of options in the initial view 702 or expanded view 720. The options may be visual buttons for clicking with a mouse or a touch screen. The options may be interactive. For example, if option 1 is hovered over via a mouse, it may annotate and provide overlaid information in initial view 702 or expanded view 720 further explaining the reasons and technical explanation behind the recommendation provided. Reconstruction options 738 may include specific words such as "Snapshot Freeze and 75%." Reconstruction options 738 may include options specific to the patient and the current scan. Reconstruction options 738 may include recommendations based on big data information from other scan rooms, other hospitals, and other regions. Reconstruction options 738 may provide historical analysis, such as which option has been most selected in the past based on similar conditions. Reconstruction options 738 may query remote systems to provide additional context and information to the decision-maker.

Example methods for image reconstruction prescriptions and recommendations can include, but are not limited to: center, center all, earliest to latest, earliest to latest all, function reconstruction, and others. Center may reconstruct the center phase of the primary phase or phase range prescribed. Center all may reconstruct the center phase for all phase ranges with low noise for use in cardiac diagnosis (non-function diagnosis). Earliest to latest uses a user specified interval, limited to the data that the system determines to have high signal (low noise). Earliest to latest may reconstruct the earliest to latest prescribed phases at a user specified interval, for example, if the system scanned 70-80% phase R-peak to R-Peak with a 2% interval, 70, 72, 74, 76, 78, and 80% would be reconstructed from one selection. Earliest to latest all may reconstruct the earliest acquired phase to latest acquired phase at a user specified interval. Earliest to latest all may process all acquired data regardless of noise. The acquired rather than prescribed phases are used as the motion rate can change during acquisition and the actual acquired phases can vary versus the prescribed phases. A user may also prescribe phases that have a lower signal (higher noise) for functional assessment of the heart function. Function reconstruction may generate N reconstructions over intervals of the measured R-to-R interval divided by N. These reconstructions could be in addition to reconstructions targeted for coronary artery evaluation. For example, with a different slice thickness than the images used for coronary imaging. Further, the system may automatically evaluate all data or a subset of data for the phase with least motion.

The system and methods disclosed herein provide visualizations that enhance the workflow and easily allow the system to automatically, and optionally with user guidance, reconstruct the cardiac phase locations required for diagnosis.

The systems and methods disclosed herein enable operators to make better images faster. Post processing time may be decreased. Thus, patients who are the subject of the scan may have a shorter exam and may have a better diagnostic image for addressing medical concerns. Further, creating a reduction in the time needed for the patient to be on the table can increase customer patient flow for medical service providers.

Graphic visualizations can be useful for scans with small collimations and multiple exposures where the available phases and reconstruction phases for all exposures can be shown condensed into one representative motion cycle, a heartbeat for example. Embodiments herein may be especially useful on systems with smaller collimations (i.e. 80 mm and 40 mm), where scans at multiple axial locations are required to cover the entire region of interest or in cases where multiple exposures are required at the same z location.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An image reconstruction system, comprising:
a gantry comprising a rotor, an x-ray tube, and an image detector, wherein the rotor is movably attached to the gantry, and the x-ray tube and the image detector are attached to the rotor;
an operator console comprising an input device and an output device; and
a processor in communication with the gantry and the operator console, and configured to receive scan data of a subject from the image detector and reconstruct the scan data into output images;
wherein the system performs the steps of
 (a) acquiring, with the processor via the gantry, scan data over a plurality of motion cycles of the subject;
 (b) generating, via the processor, representative motion data from the scan data over the plurality of motion cycles;
 (c) outputting a visualization to the output device of the representative motion data; and
 (d) outputting image reconstruction recommendations to the output device based on the scan data, wherein the outputted image reconstruction recommendations are visually overlaid on top of the visualization.

2. The image reconstruction system of claim 1, wherein the system further performs the steps of
 (e) receiving an input selection from the input device, the input selection corresponding to an image reconstruction selection;
 (f) reconstructing the scan data into an output image based on the input selection; and
 (g) outputting the output image to the output device.

3. The image reconstruction system of claim 1, wherein: the output device is one of a display, a printer, a network, or a storage memory.

4. The image reconstruction system of claim 1, wherein: the motion cycles are one of cardiac motion cycles, respiratory motion cycles, or gross patient motion cycles.

5. The image reconstruction system of claim 1, wherein: acquiring scan data is performed with reference to scan instructions; and
outputted image reconstruction options are generated with reference to the scan instructions.

6. The image reconstruction system of claim 1, wherein: the representative motion data is shown as a single motion cycle in the output visualization.

7. The image reconstruction system of claim 1, wherein: the generated representative motion data is a mean or median of the motion data from the plurality of motion cycles in the scan data.

8. The image reconstruction system of claim 1, wherein: the image reconstruction recommendations include a slider overlaid upon the visualized representative motion data to select a location within the motion cycle to perform image reconstruction.

9. The image reconstruction system of claim 1, wherein the system further performs the step of
 (e) receiving input indicating the request for an expanded view;
 (f) outputting an expanded view section of the visualization, such that one or more single motion cycles of scan data are shown; and
 (g) overlaying a success metric on each single cycle of scan data shown in the expanded view.

10. A method for generating and outputting a user interface for an image reconstruction system that includes a gantry with imaging components, an image reconstructor for receiving scan data from the gantry and reconstructing the scan data into output images; and an operator console for input and output, comprising:
 (a) acquiring scan data over a plurality of motion cycles of a subject;
 (b) generating representative motion data from the scan data over the plurality of motion cycles, wherein the generated representative motion data is a mean or median of the motion data from the plurality of motion cycles in the scan data;
(c) outputting a visualization to an output device of the representative motion data; and
(d) outputting image reconstruction recommendations to the output device based on the scan data.

11. The method of claim 10, wherein:
the outputted image reconstruction recommendations are visually overlaid on top of the visualization.

12. The method of claim 10, further comprising:
(e) receiving an input selection from an input device, the input selection corresponding to an image reconstruction selection;
(f) reconstructing the scan data into an output image based on the input selection; and
(g) outputting the output image to the output device.

13. The method of claim 10, wherein:
the output device is one of a display, a printer, a network, or a storage memory.

14. The method of claim 10, wherein:
the motion cycles are one of cardiac motion cycles, respiratory motion cycles, or gross patient motion cycles.

15. The method of claim 10, wherein:
acquiring scan data is performed with reference to scan instructions; and
outputted image reconstruction options are generated with reference to the scan instructions.

16. The method of claim 10, wherein:
the representative motion data is shown as a single motion cycle in the output visualization.

17. The method of claim 10, wherein:
the image reconstruction recommendations include a slider overlaid upon the visualized representative motion data to select a location within the motion cycle to perform image reconstruction.

18. The method of claim 10, further comprising:
(e) receiving input indicating the request for an expanded view;
(f) outputting an expanded view section of the visualization, such that one or more single motion cycles of scan data are shown; and
(g) overlaying a success metric on each single cycle of scan data shown in the expanded view.

19. An image reconstruction system, comprising:
a gantry comprising a rotor, an x-ray tube, and an image detector, wherein the rotor is movably attached to the gantry, and the x-ray tube and the image detector are attached to the rotor;
an operator console comprising an input device and an output device;
a processor in communication with the gantry and the operator console, and configured to receive scan data of a subject from the image detector and reconstruct the scan data into output images;
wherein the system performs the steps of
(a) acquiring, with the processor via the gantry, scan data over a plurality of motion cycles of the subject;
(b) generating, via the processor, representative motion data from the scan data over the plurality of motion cycles;
(c) outputting a visualization to the output device of the representative motion data; and
(d) outputting image reconstruction recommendations to the output device based on the scan data, wherein the image reconstruction recommendations include a slider overlaid upon the visualized representative motion data to select a location within the motion cycle to perform image reconstruction.

* * * * *